United States Patent [19]

Muth et al.

[11] 4,198,093

[45] Apr. 15, 1980

[54] MOTORCYCLE COVERING

[75] Inventors: Hans-Albrecht Muth, Hechendorf; Rudolf Stark, Poing; Hans-Günther v. d. Marwitz, Munich; Peter Hundemer, Puchheim; Heinz Estel, Munich; Dirk Reissig, Schweitenkirchen, all of Fed. Rep. of Germany

[73] Assignee: Bayerische Motoren Werke Aktiengesellschaft, Fed. Rep. of Germany

[21] Appl. No.: 799,966

[22] Filed: May 24, 1977

[30] Foreign Application Priority Data

Jun. 3, 1976 [DE] Fed. Rep. of Germany ....... 2624851

[51] Int. Cl.² .............................................. B62J 17/02
[52] U.S. Cl. ................................ 296/78.1; 280/289 S; D12/182
[58] Field of Search ............................ 296/78.1, 84 R; 280/289 G, 289 S, 289 H; D12/182; 85/32 K; 151/41.73

[56] References Cited

U.S. PATENT DOCUMENTS

| 3,154,342 | 10/1964 | Mueller | 296/78.1 |
| 3,403,718 | 10/1968 | Hughes | 151/41.73 |
| 3,787,088 | 1/1974 | Dreyer, Sr. | 296/78.1 |
| 4,023,853 | 5/1977 | Oguma et al. | 296/78.1 |

FOREIGN PATENT DOCUMENTS

| 2060709 | 12/1970 | Fed. Rep. of Germany. |
| 7525262 | 4/1976 | Fed. Rep. of Germany. |
| 1152863 | 2/1958 | France. |
| 1411066 | 8/1965 | France. |

Primary Examiner—Joseph F. Peters, Jr.
Assistant Examiner—Donn McGiehan
Attorney, Agent, or Firm—Craig and Antonelli

[57] ABSTRACT

A fairing-like covering for a motorcycle which covers off essentially the area of the handlebar as well as lateral areas of the motorcycle; the lateral coverings are thereby drawn-in essentially to the rear of the front wheel, as viewed in the driving direction, to a distance from one another that corresponds approximately to the width of the front wheel fork; the lateral coverings are connected with each other at least within the area of the handlebar by way of an intermediate member.

46 Claims, 8 Drawing Figures

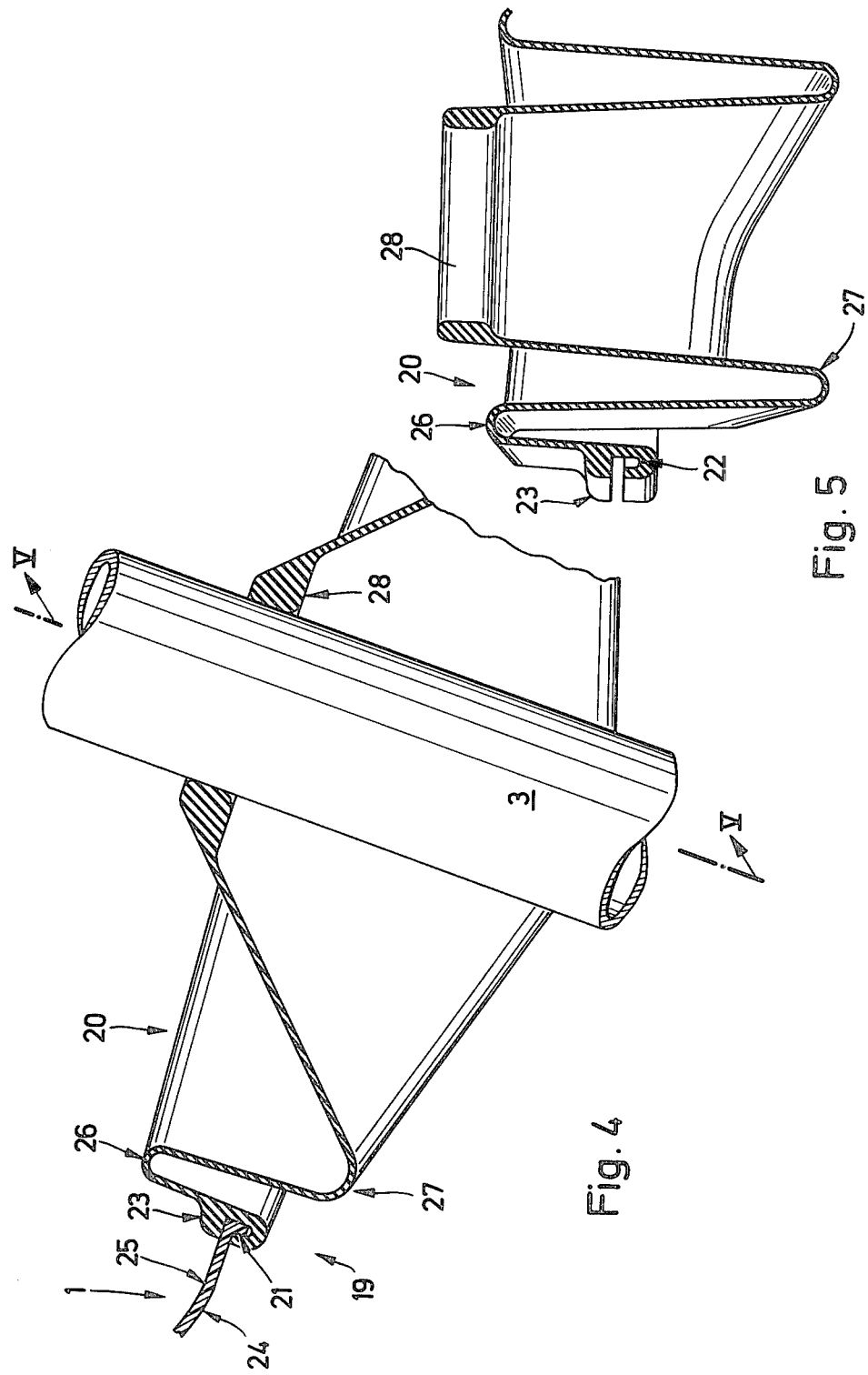

MOTORCYCLE COVERING

The present invention relates to a covering for a motorcycle which covers off essentially the area of the handlebar as well as lateral areas of the motorcycle whereby the lateral coverings are drawn-in behind the front wheel, as viewed in the driving direction, to a distance that corresponds approximately to the width of the front wheel fork.

Such coverings made of one-piece construction are known in the prior art. The aperture provided at the front end face of the covering which is matched to the width of the front wheel fork, thereby serves the purpose to permit installation of the covering at the motorcycle without disassembly of the front wheel fork. These unitary coverings constructed in one-piece, with a view toward an inexpensive manufacture, are formed essentially of a spherically shaped shell which can be readily removed at the end of the manufacturing process out of the tool form or mold. Coverings of such type disadvantageously do not enable a particular styling adaptation to the motorcycle or an appropriate aerodynamic configuration.

The aim of the present invention resides in so constructing a covering of the type described above that it can be freely designed for the requirements of greatest possible weather protection for the driver, of an aerodynamic configuration to increase the driving safety as well as of the cooling air conduction to the driving aggregate and finally for a configuration reflecting a proper design and styling.

As solution to the underlying problems, it is proposed according to the present invention that the lateral coverings are connected with each other at least within the area of the handlebar by way of an intermediate member.

The three-partite construction of the fairing-like covering according to the present invention requires admittedly a corresponding number of molds or dies but produces the advantage of design and configuration possibilities of the covering corresponding to the aforementioned requirements.

Accordingly, it is an object of the present invention to provide a motorcycle covering in the form of a fairing which avoids by simple means the aforementioned shortcomings and drawbacks encountered in the prior art.

Another object of the present invention resides in a motorcycle covering which permits a matching of the fairing-like covering configuration to the motorcycle which is appealing from a styling point of view.

A further object of the present invention resides in a motorcycle covering which has a shape that is favorable as regards aerodynamics.

Still a further object of the present invention resides in a motorcycle covering that provides greatest possible weather protection for the driver.

These and other objects, features and advantages of the present invention will become more apparent from the following description when taken in connection with the accompanying drawing which shows, for purposes of illustration only, one embodiment in accordance with the present invention, and wherein:

FIG. 4 is a partial cross-sectional view through the folding sleeve of the covering in accordance with the present invention, taken along line IV—IV of FIG. 3;

FIG. 5 is a cross-sectional view through the bellows sleeve taken along line V—V of FIG. 4;

Figure 1:
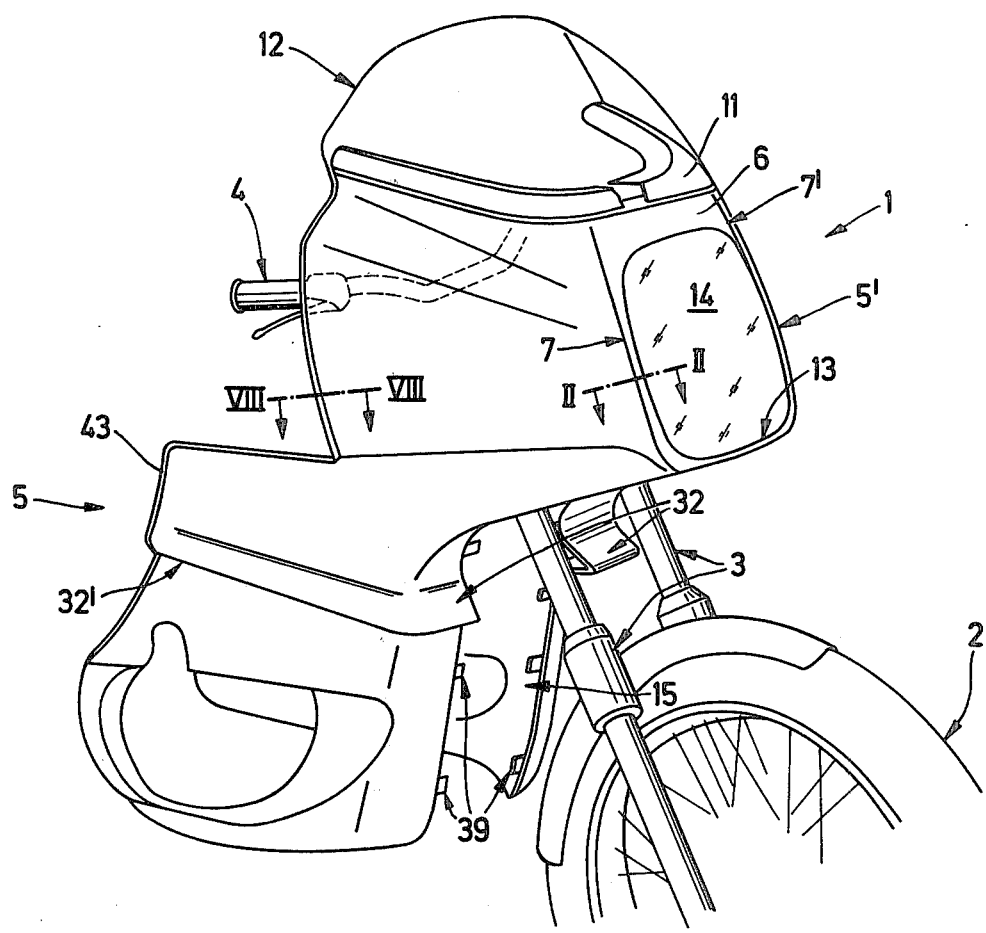
FIG. 1 is a perspective view from in front and to the side of a covering for a motorcycle in accordance with the present invention.

Referring now to the drawing wherein like reference numerals are used throughout the various views to designate like parts, FIG. 1 illustrates a fairing-like covering generally designated by reference numeral 1 for a motorcycle, of which only the front wheel 2 with the fork legs 3 as well as the handlebar 4 are indicated in this figure. The fairing-like covering 1 covers essentially the area of the handlebar 4 as well as the lateral areas of the motorcycle. It includes lateral coverings 5 and 5' which extend in height essentially from the lower edge of the drive block (not shown) up to above the handlebar 4. Within the area of the handlebar 4 the two lateral coverings 5 and 5' are connected by way of an intermediate member 6. The connection between the aforementioned covering parts 5, 5' and 6 is appropriately constructed in a detachable manner. This has the advantage with a fairing-like covering 1 covering off such large areas of the motorcycle that in case of a damage of the covering 1, only the damaged covering part 5, 5' or 6 has to be exchanged and not the entire covering 1.

Figure 2:
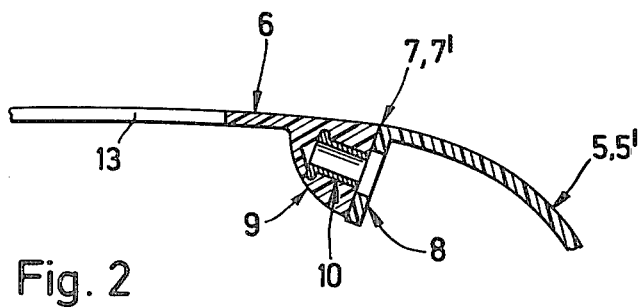
FIG. 2 is a cross-sectional view, on an enlarged scale, taken along line II—II of FIG. 1.

The lateral coverings 5 and 5' are joined together with the intermediate member 6 along the lines 7 and 7' extending essentially vertically over the covering 1. As can be seen from FIG. 2, the lateral coverings 5 and 5' and the intermediate member 6 abut flush at one another. As can be further seen from FIG. 2, the lateral coverings 5 and 5' abut each by way of a flange 8 against end surfaces of eyes 9 formed integral with the intermediate member 6. Threaded bushes 10 are arranged in the eyes 9 of the intermediate member 6 formed of synthetic resinous material which cooperate with bolts or screws extending through the flanges 8.

For purposes of reinforcement of the covering 1 within the area of the handlebar 4, the lateral coverings 5 and 5' and the intermediate member 6 are connected along the upper edge with a profile member 11 (FIG. 1) made in one piece. The profile member 11 which according to FIG. 1 is constructed V-shaped in cross section, on the one hand, is intended to preclude a fluttering of the side coverings 5 and 5' within the area of the handlebar 4 as a result of the driving wind and, on the other hand, is to help to reduce by its reinforcing effect the number of support struts between the covering 1 and the motorcycle. The profile member 11 may also serve as an instrument support. Finally, also a spherically shaped windshield 12 may be secured along the upper edge of the lateral coverings 5 and 5' and of the intermediate member 6. The intermediate member 6 is provided with an opening 13 for the passage of light of a headlight mounted on the motorcycle, which is appropriately covered off by a clear window 14 permitting the passage of the light.

As can finally be seen from FIG. 1, the lateral coverings 5 and 5' are drawn-in to the rear of the front wheel 2 to a distance corresponding approximately to the width of the front wheel fork formed of the fork legs 3. The center opening 15 (FIG. 1) which is achieved in the covering 1 at the front face thereof by the spacing of the lateral coverings 5 and 5', extends at least up to the place of passage of the fork legs 3 through the covering 1. It is achieved thereby that the covering 1 can be arranged at the motorcycle without disassembly of the front wheel fork.

Figure 3:
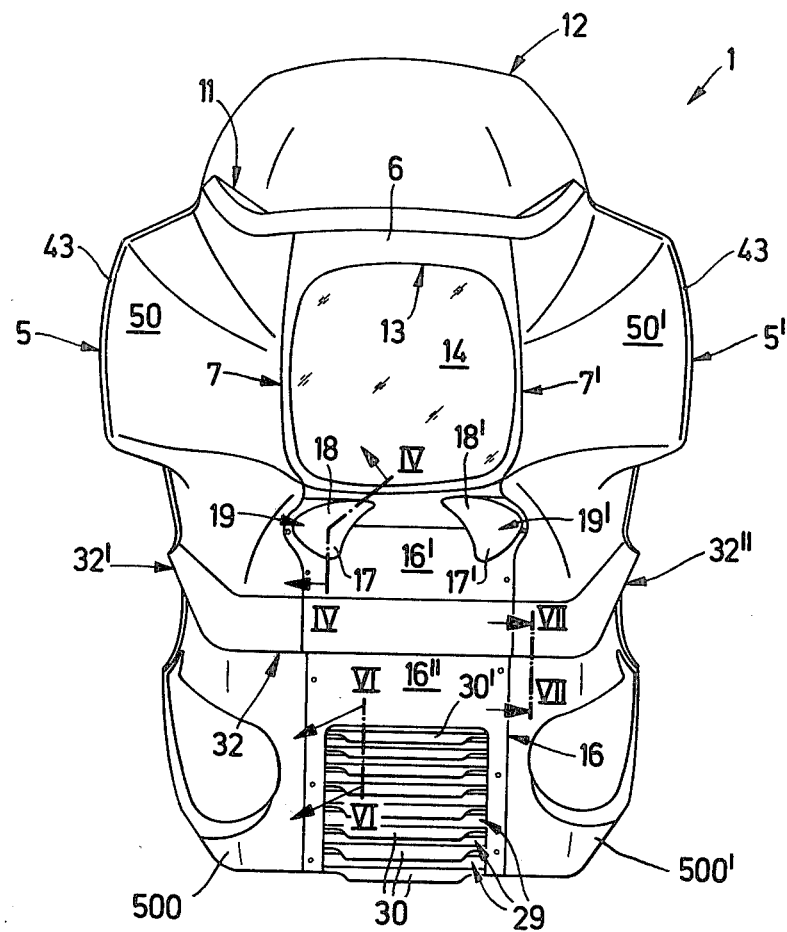
FIG. 3 is a front elevational view of the covering for a motorcycle in accordance with the present invention.

According to FIG. 3, the spacing of the lateral covers 5 and 5' within the area of the center opening 15 may be approximately identical with the spacing of the lines 7 and 7' within the area of the intermediate member 6. For purposes of achieving the greatest possible protection of the motorcycle driver against dust, dirt and water, the spacing between the lateral coverings 5 and 5' is bridged over by a closure plate 16 adjoining the intermediate member 6. The closure plate 16 is provided in its upper edge zone with the apertures 17 and 17' (FIG. 3). Apertures 18 and 18' are provided in the lower edge zone of the intermediate member 6. The apertures 17 and 18 as well as 17' and 18' form each an opening 19 and 19' for the passage therethrough of a fork leg 3 of the front wheel fork. In order to attain an optimum weather protection for the driver of the motorcycle, the openings 19 and 19' are each covered off by means of a bellows sleeve 20 (FIG. 4). Each of the shaped to kidney-shaped openings 19 and 19' includes an angularly bent edge 21. The bellows sleeve 20 lockingly forms a connection to cooperate with this edge 21 by way of a groove 22, L-shaped in cross section, which groove is provided in a bead 23. See FIGS. 4 and 5. This form-locking connection assures also with the strongest turning of the front wheel fork, as is the case, for example, when standing up the motorcycle, a safe retention of the bellows sleeve 20 at the covering 1. As a result of the angularly bent edge 21 and the correspondingly constructed groove 22, the bellows sleeve 20 and the covering 1 cooperate with each other elastically and are connected together lockingly by way of a large contact area so that so water can penetrate by way of this connection from the outer surface 24 to the inner surface 25 of the covering 1 (FIG. 4).

The bead 23 is connected by way of folds 26 and 27 with a further bead 28 which tightly surrounds the fork leg 3.

Figure 6:
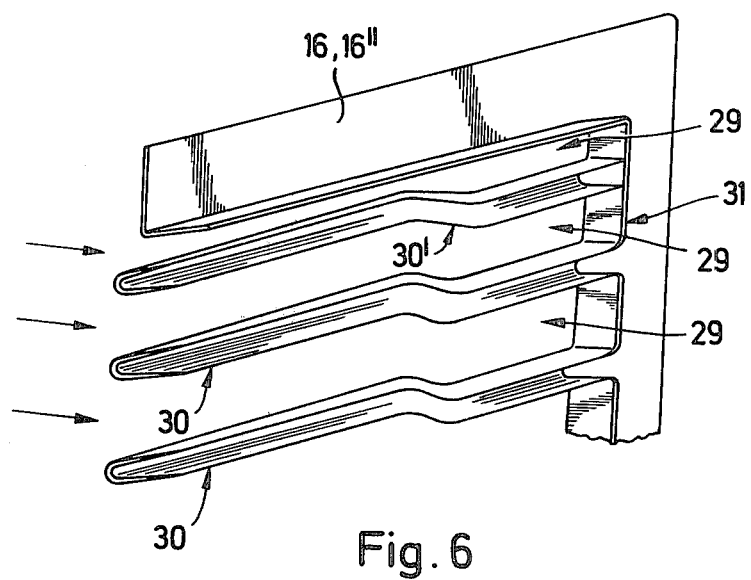
FIG. 6 is a partial perspective view of the cooling air grill within the area of the line VI—VI of FIG. 3.

According to FIG. 3, the closure plate 16 is equipped with cooling air slots 29. These cooling air slots 29 are delimited essentially by horizontally extending air-guide elements 30 (FIGS. 3 and 6) arranged at the closure plate 16. The air guide elements 30 are constructed according to FIG. 6 of a profile U-shaped in cross section and conduct the inflowing air indicated by the arrows to the drive block. It can be seen from FIG. 6 that an angularly bent portion 31 of the closure plate 16 laterally delimiting the cooling air slots 29 is constructed uninterrupted at the connecting place of the air guide element designated by reference numeral 30'. The air guide element 30' may be provided at the connecting place with the angularly bent portion 31 with an intentional breaking place. The air guide element 30 can thus be broken off in a simple manner out of the closure plate 16 whereby a cooler for a liquid operating medium can be arranged in the thus-formed gap.

Figure 7:
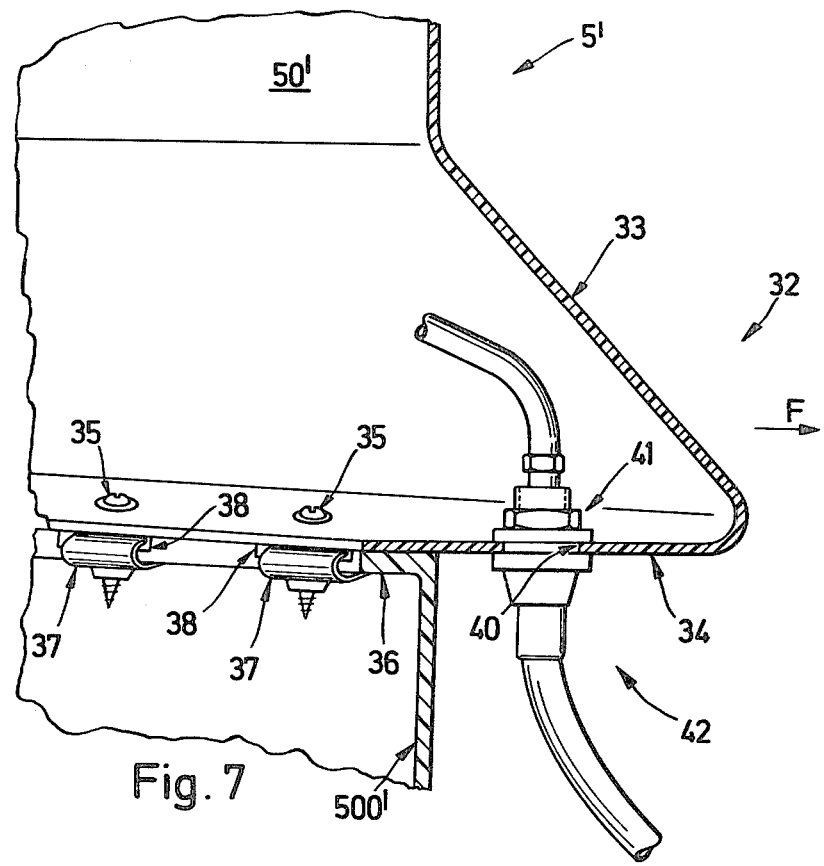
FIG. 7 is a cross-sectional view taken along line VII—VII of FIG. 3.

According to FIGS. 1 and 3, the fairing-like covering 1 preferably made of synthetic plastic material includes a spoiler 32 formed integral therewith. The spoiler 32 extends underneath the openings 19 and 19' for the fork legs 3 over the entire front face of the covering 1 formed essentially of the two drawn-in areas of the lateral coverings 5 and 5' as well as of the closure plate 16. As shown in FIGS. 1 and 7, the spoiler 32 is formed out of the wall of the covering 1 with a first obliquely downwardly directed and outwardly directed section 33, as viewed in the driving direction indicated by arrow F, and with a second section 34 connected with the first section 33 and returning approximately horizontally to the motorcycle. The spoiler 32 may be continued under preservation of its form for increasing the wheel load especially at the front wheel 2, from the front end face of the covering 1 into the longitudinal sides of the covering 1 formed by the lateral coverings 5 and 5' whereby the extensions 32' and 32" are arranged each rising rearwardly and upwardly.

As can be seen above all from FIG. 7, the fairing-like covering 1 may be constructed subdivided along the transition of the returning spoiler section 34 into the respective lateral covering 5 and 5' as well as into the closure plate 16. Preferably the upper parts 50 and 50' of the lateral coverings 5 and 5' are detachably connected with the lower parts 500 and 500' and the upper part 16' of the closure plate 16 is detachably connected with the lower part 16". As a result thereof, in case of need, the lower parts 500, 16" and 500' can be removed from the covering 1. The upper parts 50, 50' and 16' are threadably connected with the coordinated lower parts 500, 500' and 16", for which purpose a threaded connection can be used and appropriately formed of sheet metal screws 35 and sheet metal nuts 37 adapted to be mounted over the flange 36 of the aforementioned lower parts. In order that the upper and lower parts of the covering 1 can be joined tightly along their separating line, the flange 36 is provided with troughs or recesses 38 arranged in its contact surface with the spoiler section 34, into which the sheet metal nuts 37 are mounted with a leg thereof. For purposes of fastening the closure plate 16 or its upper part 16' and its lower part 16" with the lateral coverings 5 and 5', the same threaded connection is appropriately chosen. The sheet metal nuts are thereby arranged at projections 39 (FIG. 1) which project from the lateral parts 5 and 5' into the central opening 15. The projections 39 are additionally so constructed that the threadably connected closure plate 16 is flush with the lateral parts 5 and 5'.

Finally, it can be seen from FIG. 7 that an aperture 40 is arranged in the spoiler section 34 for a retention device 41 of a hydraulic brake line 42 to the brake at the front wheel 2.

Figure 8:
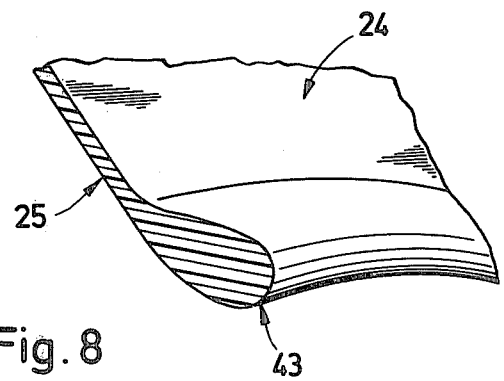
FIG. 8 is a cross-sectional view taken along line VIII—VIII of FIG. 1.

It can be seen from FIGS. 1 and 3 that the covering 1 includes at the edges facing the driver an edge bead 43 which is illustrated in detail in FIG. 8. From this figure it can be seen that the edge bead 43 is rounded off and is drawn outwardly, whereby the edge bead 43 passes over approximately tangentially in cross section into the inner surface 25 of the covering 1. The edge bead 43 in an advantageous manner influences the air flowing over the outer surface 24 of the covering 1 during its detachment from the edge of the covering 1 so favorably that any rain-water taken along from the outer surface 24 by the air stream does not hit the driver.

It is also possible within the scope of the present invention to make the intermediate member and the closure plate in one piece, whereby this part is then provided with apertures in the lateral edge zones for the passage of fork legs through the covering.

While we have shown and described only one embodiment in accordance with the present invention, it is understood that the same is not limited thereto but is susceptible of numerous changes and modifications as known to those skilled in the art, and we therefore do not wish to be limited to the details shown and described herein, but intend to cover all such changes and modifications as are encompassed by the scope of the appended claims.

We claim:

1. Multipart full wraparound covering for a motorcycle with lateral cover means which, as viewed in the driving direction, are drawn in essentially to the rear of the front wheel to a distance that corresponds approximately to the width of the front wheel fork, characterized in that:
   (a) the lateral cover means are detachably connected with each other in their upper zone by way of an intermediate member;
   (b) the lateral cover means are reinforced along the upper edge with a profile member connected to the intermediate member;
   (c) the lateral cover means are connected, up to the lower edge close to the bottom adjacent to the intermediate member, with a closure plate means, said closure plate means bridging a central opening between the lateral cover means and being constructed with cooling air slots; and
   (d) the full wraparound covering having a multipart spoiler means with at least one part on each of the lateral cover means and one part on the closure plate means, which parts are directed obliquely downwardly and outwardly from the motorcycle.

2. A covering according to claim 1, made of synthetic plastic material, characterized in that the lateral cover means abut each by way of an angularly bent flange against end surfaces of eyes formed at the intermediate member, whereby threaded bushes arranged in said eyes cooperate with threaded members extending through the flanges.

3. A covering according to claim 2, characterized in that the intermediate member includes an opening for the passage therethrough of the light of a headlight, the opening being covered off by a clear window.

4. A covering according to claim 2, characterized in that apertures are arranged in the edge zones of at least one of closure plate means, lateral cover means and intermediate member for the passage of fork legs of the front wheel fork through the covering.

5. A covering according to claim 4, characterized in that the openings for the fork legs are formed in the covering by apertures in the edge zones of at least two of the parts consisting of closure plate means, intermediate member and lateral covering means.

6. A covering to claim 5, characterized in that the openings are each covered off by means of a bellows sleeve.

7. A covering according to claim 6, characterized in that the edge of each opening is constructed angularly bent and the bellows sleeve is provided with a groove that is L-shaped in cross section and is arranged in a bead for the form-locking connection with the edge.

8. A covering according to claim 7, characterized in that the closure plate means includes horizontally extending air guide elements which delimit essentially the cooling air slots.

9. A covering according to claim 8, characterized in that the air guide elements are made of a profile member approximately U-shaped in cross section and in that at least one air guide element is constructed with intentional breaking places in the connecting areas with the closure plate means.

10. A covering according to claim 9, characterized in that the spoiler means is arranged at the front end face of the covering underneath the openings for the fork legs.

11. A covering according to claim 10, characterized in that the spoiler means includes sections which are connected with the downwardly and outwardly directed parts and which return approximately horizontally toward the motorcycle.

12. A covering according to claim 11, characterized in that said parts of the spoiler means on the lateral cover means are arranged rising up toward the rear.

13. A covering according to claim 12, characterized in that the covering at the transition of the returning spoiler section into the lateral cover means as well as into the closure plate means is constructed subdivided.

14. A covering with upper and lower parts according to claim 13, characterized in that the upper and lower parts of the covering are detachably connected with each other.

15. A covering according to claim 14, characterized in that a returning spoiler section is provided with apertures for the arrangement of retention means for at least one of an electric and hydraulic line.

16. A covering according to claim 15, characterized in that the edges of the covering facing the driver include a rounded-off edge bead.

17. A covering according to claim 16, characterized in that the edge bead is drawn out toward the outside, whereby the edge bead passes over approximately tangentially in cross section into the inner surface of the covering.

18. A covering according to claim 17, characterized in that the lateral cover means are constructed flush with the intermediate member and the closure plate means.

19. A covering according to claim 18, characterized in that the intermediate member and the closure plate means are made of one piece which is provided in the lateral edge zones with apertures for the passage of the fork legs through the covering.

20. A covering according to claim 1, characterized in that apertures are arranged in the edge zones of at least one of closure plate means, lateral cover means and intermediate member for the passage of fork legs of the front wheel fork through the covering.

21. A covering according to claim 20, characterized in that the openings for the fork legs are formed in the covering by apertures in the edge zones of at least two of the parts consisting of closure plate means, intermediate member and lateral covering means.

22. A covering according to claim 21, characterized in that the openings are each covered off by means of a bellows sleeve.

23. A covering according to claim 22, characterized in that the edge of each opening is constructed angularly bent and the bellows sleeve is provided with a groove that is L-shaped in cross section and is arranged in a bead for the form-locking connection with the edge.

24. A covering according to claim 23, characterized in that the closure plate means includes horizontally extending air guide elements which delimit essentially the cooling air slots.

25. A covering according to claim 24, characterized in that the air guide elements are made of a profile member approximately U-shaped in cross section and in that at least one air guide element is constructed with intentional breaking places in the connecting areas with the closure plate means.

26. A covering according to claim 20, characterized in that the intermediate member and the closure plate means are made of one piece which is provided in the lateral edge zones with apertures for the passage of the fork legs through the covering.

27. A covering according to claim 1, characterized in that the spoiler means is arranged at the front end face of the covering underneath openings for the fork legs.

28. A covering according to claim 27, characterized in that the spoiler means includes sections which are connected with the downwardly and outwardly directed parts and which return approximately horizontally toward the motorcycle.

29. A covering according to claim 27, characterized in that said parts of the spoiler means on the lateral cover means are arranged rising up toward the rear.

30. A covering according to claim 28, characterized in that the covering at the transition of the returning spoiler section into the lateral cover means as well as into the closure plate means is constructed subdivided.

31. A covering according to claim 28, characterized in that the a returning spoiler section is provided with apertures for the arrangement of retention means for at least one of an electric and hydraulic line.

32. A covering according to claim 1, characterized in that the edges of the covering facing the driver include a rounded-off edge bead.

33. A covering according to claim 32, characterized in that the edge bead is drawn out toward the outside, whereby the edge bead passes over approximately tangentially in cross section into the inner surface of the covering.

34. A covering according to claim 1, characterized in that the intermediate member has integrally molded eyes with end surfaces formed at essentially vertically extending junction lines of the intermediate member and against which end surfaces abut an angularly bent flange of the lateral cover means, whereby threaded bushes arranged in said eyes cooperate with threaded members extending through the flanges.

35. A covering according to claim 34, characterized in that the intermediate member has an opening for the passage therethrough of the light of a headlight, the opening being covered off by a clear window.

36. A covering according to claim 1, characterized in that the profile member is made of one piece and is of an approximate V-shape in cross section, this member being constructed as an instrument support.

37. A covering according to claim 1, characterized in that apertures are arranged for the passage of fork legs of the front wheel fork through the covering, and further characterized in that the openings for the fork legs are formed in the covering by apertures in the edge zones of the intermediate member and the closure plate means, the openings each being covered off by means of a bellows sleeve.

38. A covering according to claim 37, characterized in that the intermediate member and the closure plate means are constructed angularly bent along the edge of each opening and the bellows sleeve is provided with a groove that is L-shaped in cross section and is arranged in a bead for the form-locking connection with the edge.

39. A covering according to claim 1, characterized in that the closure plate means includes horizontally extending air guide elements which delimit essentially the cooling air slots, the air guide elements being made of a profile member approximately U-shaped in cross section, and in that at least one air guide element is constructed with intentional breaking places in the connecting areas, with the closure plate means.

40. A covering according to claim 1, characterized in that the spoiler means is formed from a wall of the covering with said parts directed obliquely downwardly and with sections connected with said parts and returning approximately horizontally toward motorcycle wherein the covering is subdivided, at the transition from the returning spoiler sections to the respective lateral cover means as well as to the closure plate means, into upper and lower parts connected with each other.

41. A covering according to claim 40, characterized in that the spoiler means in each of the longitudinal sides of the covering formed by the lateral cover means rises upwardly toward the rear.

42. A covering according to claim 40, characterized in that a returning spoiler section is provided with apertures for the arrangement of retention means for at least one of an electric and hydraulic line.

43. A covering according to claim 1, characterized in that the lateral cover means each include a rounded-off edge bead along the edges of the covering facing the driver.

44. A covering according to claim 43, characterized in that the edge bead is drawn out toward the outside, whereby the edge bead passes over approximately tangentially in cross section into the inner surface of the covering.

45. A covering according to claim 3, characterized in that the profile member is made of one piece and is of an approximate V-shape in cross section, this member being constructed as an instrument support.

46. A covering according to claim 12, characterized in that the spoiler means is formed from a wall of the covering with said parts directed obliquely downwardly and sections connected with said parts and returning approximately horizontally toward the motorcycle wherein the covering is subdivided, at the transition from the returning spoiler sections to the respective lateral cover means as well as to the closure plate means, into upper and lower parts connected with each other.

* * * * *